United States Patent
Vinitzky

(10) Patent No.: US 6,988,117 B2
(45) Date of Patent: *Jan. 17, 2006

(54) BIT-REVERSED INDEXING IN A MODIFIED HARVARD DSP ARCHITECTURE

(75) Inventor: Gil Vinitzky, Azur (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 651 days.

This patent is subject to a terminal disclaimer.

(21) Appl. No.: 10/028,938

(22) Filed: Dec. 28, 2001

(65) Prior Publication Data

US 2003/0131032 A1    Jul. 10, 2003

(51) Int. Cl.
*G06F 15/00*    (2006.01)

(52) U.S. Cl. .................... 708/400; 708/404

(58) Field of Classification Search ............ 708/600, 708/402, 403, 404, 405, 408, 409
See application file for complete search history.

(56) References Cited

U.S. PATENT DOCUMENTS 4,916,649 A * 4/1990 Yorozu et al. ............. 708/404
5,430,667 A * 7/1995 Takano .................... 708/404
6,631,167 B1 * 10/2003 Cambonie et al. ......... 375/260

* cited by examiner

*Primary Examiner*—Chuong D Ngo
(74) *Attorney, Agent, or Firm*—Pearl Cohen Zedek Latzer, LLP

(57) ABSTRACT

A method for indexing a plurality of ordered elements stored in bit-reversed order in a first and a second memory space, the first memory space indexed by a first memory index denoting memory positions in the first memory space, the second memory space indexed by a second memory index denoting memory positions in the second memory space, the logical position of the elements within the ordered elements indexed by an element index, the method including bit-reversing the element index of a selected element, locating the selected element as being in the first memory space where the MSB of the bit-reversed index equals 0 and the second memory space where the MSB of the bit-reversed index equals 1, and locating the position of the selected element within the MSB-located memory space at the memory index of the MSB-located memory space that corresponds to the non-MSB bits of the bit-reversed index.

7 Claims, 2 Drawing Sheets

BIT-REVERSED INDEXING IN A MODIFIED HARVARD DSP ARCHITECTURE

FIELD OF THE INVENTION

The present invention is related to digital signal processing (DSP) in general, and more particularly to indexing techniques in modified Harvard DSP architectures

BACKGROUND OF THE INVENTION

In DSP architectures that perform "in-place" fast Fourier transform (FFT) calculations, the results of the FFT are typically stored in memory in a non-consecutive order. For example, as shown in Table A below, an eight-point FFT having an initial array i of data elements numbered 0–7 will result in an output array j ordered as shown, with, for example, the results of the FFT calculation element 4 of array i being stored as the second element of array j.

TABLE A

| i | j |
|---|---|
| 0 | 0 |
| 1 | 4 |
| 2 | 2 |
| 3 | 6 |
| 4 | 1 |
| 5 | 5 |
| 6 | 3 |
| 7 | 7 |

Where a single memory space is used to store the results of in-place FFT calculations, such as in a Harvard or von Neumann architecture, a standard bit-reversing technique may be used to determine the position of a particular element in the memory space as follows. A binary index is used to represent each input element of an n-point FFT and each storage position in the memory space. The binary index is created of r digits where an n-point FFT is expressed as $n=2^r$. Thus, an eight-point FFT will have a binary index of three digits as $8=2^3$. As is shown in Table B below, the position of the results of an FFT calculation on an element in array i may be located in array j by bit-reversing the element's binary index. For example, the binary index of element 4 is 100 ($4_{10}=100_2$). Bit reversing 100 results in a binary index of 001. Thus, the position of the result of an FFT calculation on element 4 in array i is located in array j at position 001.

TABLE B

| i | Memory/element index | j |
|---|---|---|
| 0 | 000 | 0 |
| 1 | 001 | ... 4 |
| 2 | 010 | 2 |
| 3 | 011 | 6 |
| 4 | ... 100 | 1 |
| 5 | 101 | 5 |
| 6 | 110 | 3 |
| 7 | 111 | 7 |

Where more than one memory space is used to store the results of FFT calculations, such as in a modified Harvard architecture, standard bit-reversing techniques may not be used to determine the position of a particular element. Table C shows the positions of FFT input elements in arrays $i_1$ and $i_2$ as being stored in memory spaces X and Y respectively, while Table D shows the positions of the FFT results in arrays $j_1$ and $j_2$ being stored bit-reversed in memory spaces X and Y respectively. The binary index of element 3 is 011 ($3_{10}=011_2$). Bit reversing 011 results in a binary index of 110. However, as each memory space X and Y contain only n/2 elements of an n-point FFT, the binary index of each memory space for an eight-point FFT only extends from 000 to 011. Thus, the position of the result of an FFT calculation on element 3 cannot be determined through standard bit reversing, as no memory position exists having a memory index of 110.

TABLE C

| Memory space X | | Memory space Y | |
|---|---|---|---|
| Memory index | $i_1$ | Memory index | $i_2$ |
| 000 | 0 | 000 | 4 |
| 001 | 1 | 001 | 5 |
| 010 | 2 | 010 | 6 |
| 011 | 3 | 011 | 7 |

TABLE D

| Memory space X | | Memory space Y | |
|---|---|---|---|
| Memory index | $j_1$ | Memory index | $j_2$ |
| 000 | 0 | 000 | 1 |
| 001 | 4 | 001 | 5 |
| 010 | 2 | 010 | 3 |
| 011 | 6 | 011 | 7 |

Prior art solutions to indexing in a modified Harvard DSP architecture include copying the FFT results from memory space Y to memory space X, thereby combining all FFT results into a single memory space that may be indexed using simple bit reversing. Unfortunately, this requires additional clock cycles to accomplish and also requires additional memory. Another prior art solution involves reading input from one memory space and writing the results to the other memory space. This, too, comes at the cost of additional memory overhead.

An indexing solution for use with a modified Harvard DSP architecture that requires less additional processing and memory overhead than prior art solutions would, therefore, be advantageous.

SUMMARY OF THE INVENTION

There is provided in accordance with an embodiment of the present invention a method for indexing a plurality of ordered elements stored in bit-reversed order in a first and a second memory space. The first memory space is indexed by a first memory index denoting the memory positions in the first memory space, and the second memory space is indexed by a second memory index denoting the memory positions in the second memory space. The logical position of each of the elements within the plurality of ordered elements is indexed by an element index. The method may include bit-reversing the element index of a selected one of the elements, locating the selected element as being in either of the first memory space where the most significant bit (MSB) of the bit-reversed element index equals 0 and the second memory space where the MSB of the bit-reversed element index equals 1, and locating the position of the selected element within the MSB-located memory space at the memory index of the MSB-located memory space that corresponds to the non-MSB bits of the bit-reversed element index.

Moreover, the indices may be binary indices, there may be n of the elements, and the memory indices may each comprise s digits where n/2 equals $2^s$, and the element index may comprise t digits where n equals $2^t$.

There is also provided in accordance with an embodiment of the present invention a Digital Signal Processing architecture capable of storing a plurality of ordered elements in bit-reversed order in a first and a second memory space. The architecture may include a first memory index denoting the memory positions in the first memory space, a second memory index denoting the memory positions in the second memory space, and an element index denoting the logical position of each of the elements within the plurality of ordered elements. The architecture may also include means for bit-reversing the element index of a selected one of the elements and means for locating the selected element as being in either of the first memory space where the most significant bit (MSB) of the bit-reversed element index equals 0 and the second memory space where the MSB of the bit-reversed element index equals 1. The architecture may also include means for locating the position of the selected element within the MSB-located memory space at the memory index of the MSB-located memory space that corresponds to the non-MSB bits of the bit-reversed element index.

Moreover, the indices may be binary indices, there may be n of the elements, and the memory indices may each comprise s digits where n/2 equals $2^s$, and the element index may comprise t digits where n equals $2^t$.

There is provided in accordance with an embodiment of the present invention a Digital Signal Processor which may include a first memory space and a second memory space collectively capable of storing a plurality of ordered elements in bit-reversed order, and first memory indexing means operative to denote in a first memory index the memory positions in the first memory space and second memory indexing means operative to denote in a second memory index the memory positions in the second memory space. The Digital Signal Processor may also include element indexing means operative to denote in an element index the logical position of each of the elements within the plurality of ordered elements. The Digital Signal Processor may also include processing means. The processing means may include means for bit-reversing the element index of a selected one of the elements, means for locating the selected element as being in either of he first memory space where the most significant bit (MSB) of he bit-reversed element index equals 0 and the second memory space where the MSB of the bit-reversed element index equals 1, and means for locating the position of the selected element within he MSB-located memory space at the memory index of the MSB-located memory space that corresponds to the non-MSB bits of the bit-reversed element index.

Moreover, the indices may be binary indices, there may be n of the elements, and the memory indices may each comprise s digits where n/2 equals $2^s$, and the element index may comprise t digits where n equals $2^t$.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
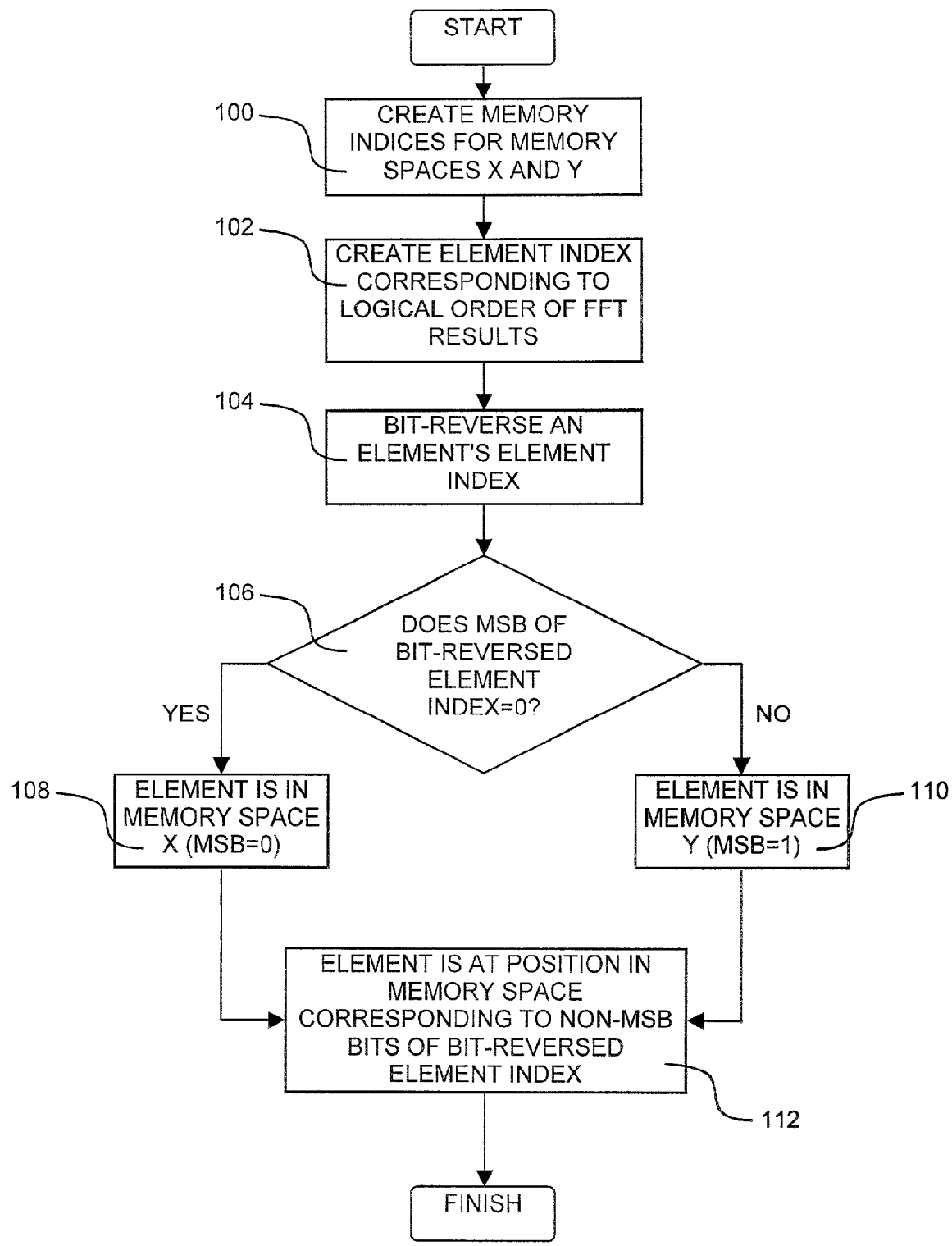
FIG. 1 is a flowchart illustration of a method of bit-reversed indexing in a modified Harvard DSP architecture, operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures and components have not been described in detail so as not to obscure the present invention.

Figure 2:
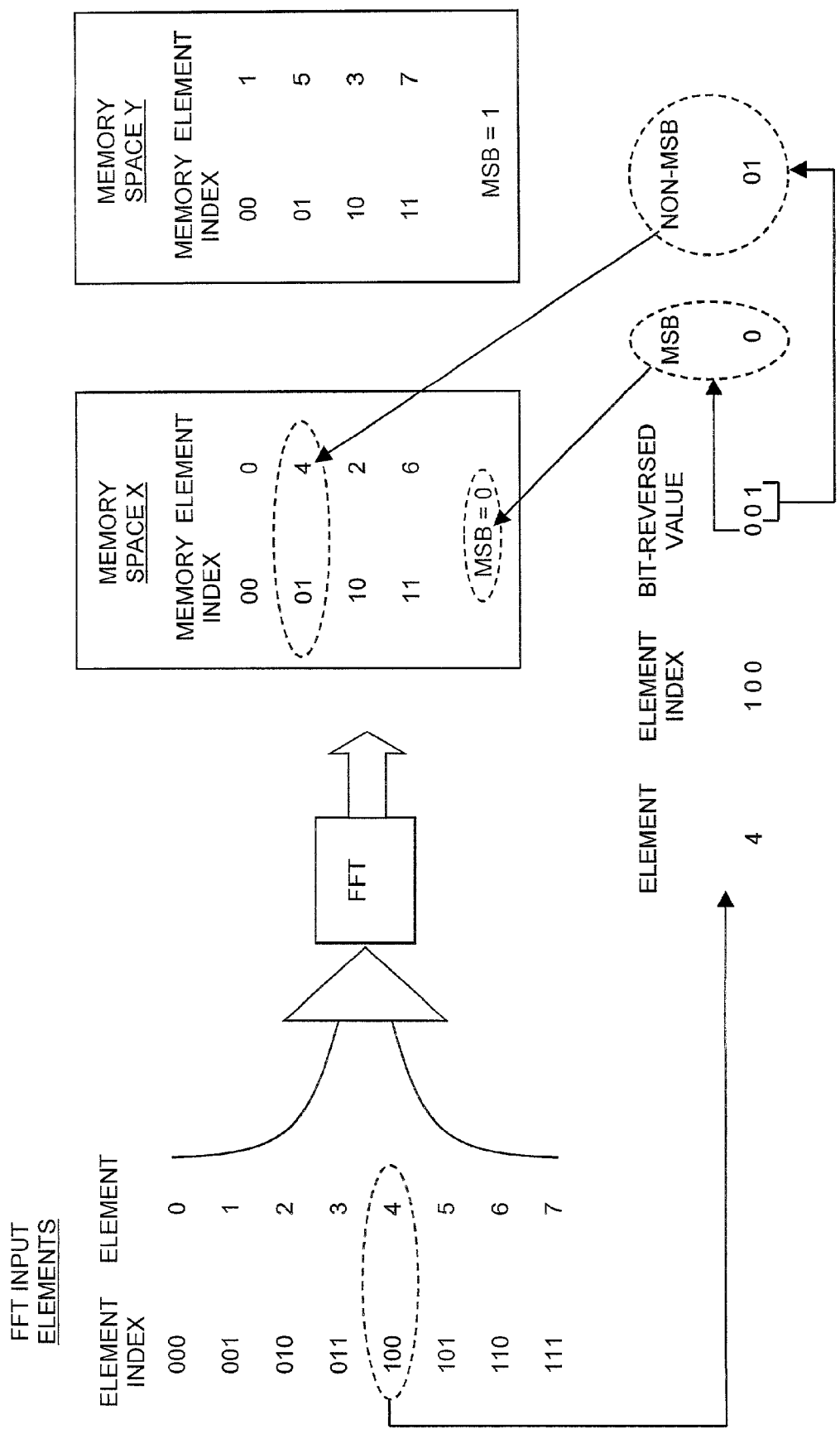
FIG. 2 is a pictorial flow illustration of an exemplary implementation of the method of FIG. 1, operative in accordance with a preferred embodiment of the present invention.

Reference is now made to FIG. 1 which is a flowchart illustration of a method of bit-reversed indexing in a modified Harvard DSP architecture, operative in accordance with a preferred embodiment of the present invention, and additionally to FIG. 2 which is a pictorial flow illustration of an exemplary implementation of the method of FIG. 1, useful in understanding the present invention. The method of FIG. 1 proceeds from the point at which FFT results are stored in arrays $j_1$ and $j_2$ in memory spaces X and Y respectively as shown in Table E below. In the method of FIG. 1, a binary memory index of s digits, where an n-point FFT is expressed as $n/2=2^s$, is used to denote the memory positions in each of the memory spaces X and Y (step 100). Thus, an eight-point FFT will have a binary memory index of two digits (as $8/2=2^2$) ranging from 00 to 11 as shown in Table E.

TABLE E

| Memory space X | | Memory space Y | |
| --- | --- | --- | --- |
| Memory index | $j_1$ | Memory index | $j_2$ |
| 00 | 0 | 00 | 1 |
| 01 | 4 | 01 | 5 |
| 10 | 2 | 10 | 3 |
| 11 | 6 | 11 | 7 |

A binary element index of t digits where an n-point FFT is expressed as $n=2^t$, is created corresponding to the logical position of the FFT output element among all FFT output elements (step 102). Thus, an eight-point FFT will have a binary element index of three digits as $8=2^3$. Thus, for example, the binary element index of element 4 is 100 ($4_{10}=100_2$). To determine the position of an element in memory spaces X and Y, the element's binary element index is bit reversed (step 104), and the most significant bit (MSB) of the bit reversed binary element index is used to indicate in which memory space the element may be found (step 106), with an MSB=0 indicating that the element may be found in memory space X (step 108) and an MSB=1 indicating that the element may be found in memory space Y (step 110). For example, the bit reversal of the binary element index 100 of element 4 results in a bit-reversed value of 001. The MSB of 001=0, therefore the FFT results corresponding to element 4 will be found in memory space X.

Once an element's memory space has been determined using the MSB of the bit-reversed value of the element's binary element index, the element's actual position in the memory space may then be found by using the non-MSB bits of the bit-reversed value of the element's binary element index, and using the non-MSB bits for the binary memory index in the element's memory space (step 112). For example, the non-MSB bits of the bit reversed value 001 of the binary element index 100 of element 4 are "01." Thus, the FFT results corresponding to element 4 will be found at memory index 01 in memory space X.

It is appreciated that one or more of the steps of any of the methods described herein may be omitted or carried out in a different order than that shown, without departing from the true spirit and scope of the invention.

It is appreciated that the methods and apparatus described herein may be implemented using computer hardware and/or software using conventional techniques.

While the present invention has been described with reference to one or more specific embodiments, the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for indexing a plurality of ordered elements stored in bit-reversed order in a first memory space and a separate second memory space, wherein said first memory space is indexed by a first memory index denoting the memory positions in said first memory space, wherein said second memory space is indexed by a second memory index denoting the memory positions in said second memory space, and wherein the logical position of each of said elements within said plurality of ordered elements is indexed by an element index, the method comprising:

bit-reversing the element index of a selected one of said elements;

locating said selected element as being in either of said first memory space where the most significant bit (MSB) of said bit-reversed element index equals 0 and said second memory space where the MSB of said bit-reversed element index equals 1; and locating the position of said selected element within said MSB-located memory space at the memory index of said MSB-located memory space that corresponds to the non-MSB bits of said bit-reversed element index.

2. A method according to claim 1 wherein said indices are binary indices, wherein there are n of said elements, wherein said memory indices each comprise s digits where n/2 equals $2^s$, and wherein said element index comprises t digits where n equals $2^t$.

3. A Digital Signal Processing architecture capable of storing a plurality of ordered elements in bit-reversed order in a first memory and a separate second memory, the architecture comprising:

a first memory index denoting the memory positions in said first memory;

a second memory index denoting the memory positions in said second memory;

an element index denoting the logical position of each of said elements within said plurality of ordered elements;

means for bit-reversing the element index of a selected one of said elements;

means for locating said selected element as being in either of said first memory where the most significant bit (MSB) of said bit-reversed element index equals 0 and said second memory where the MSB of said bit-reversed element index equals 1; and means for locating the position of said selected element within said MSB-located memory at the memory index of said MSB-located memory that corresponds to the non-MSB bits of said bit-reversed element index.

4. An architecture according to claim 3 wherein said indices are binary indices, wherein there are n of said elements, wherein said memory indices each comprise s digits where n/2 equals $2^s$, and wherein said element index comprises t digits where n equals $2^t$.

5. An architecture according to claim 3 and further comprising means for creating any of said indices.

6. A Digital Signal Processor comprising:

a first memory and a separate second memory collectively capable of storing a plurality of ordered elements in bit-reversed order;

first memory indexing means operative to denote in a first memory index the memory positions in said first memory;

second memory indexing means operative to denote in a second memory index the memory positions in said second memory;

element indexing means operative to denote in an element index the logical position of each of said elements within said plurality of ordered elements; and processing means comprising:

means for bit-reversing the element index of a selected one of said elements;

means for locating said selected element as being in either of said first memory where the most significant bit (MSB) of said bit-reversed element index equals 0 and said second memory space where the MSB of said bit-reversed element index equals 1; and means for locating the position of said selected element within said MSB-located memory at the memory index of said MSB-located memory that corresponds to the non-MSB bits of said bit-reversed element index.

7. A processor according to claim 6 wherein said indices are binary indices, wherein there are n of said elements, wherein said memory indices each comprise s digits where n/2 equals $2^s$, and wherein said element index comprises t digits where n equals $2^t$.

* * * * *